(12) United States Patent
Kamali

(10) Patent No.: US 12,157,149 B2
(45) Date of Patent: Dec. 3, 2024

(54) SYSTEM FOR CLEANING A DRIVE OVER READER SENSOR COMPONENT

(71) Applicant: The Goodyear Tire & Rubber Company, Akron, OH (US)

(72) Inventor: Duran Kamali, Bochum (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 205 days.

(21) Appl. No.: 18/045,212

(22) Filed: Oct. 10, 2022

(65) Prior Publication Data

US 2023/0166300 A1     Jun. 1, 2023

Related U.S. Application Data

(60) Provisional application No. 63/283,681, filed on Nov. 29, 2021.

(51) Int. Cl.
    *B08B 3/02*           (2006.01)
    *G01B 11/22*        (2006.01)

(52) U.S. Cl.
    CPC ............. *B08B 3/02* (2013.01); *G01B 11/22* (2013.01)

(58) Field of Classification Search
CPC .. B08B 3/02; B08B 5/02; B08B 3/024; B08B 5/00; B08B 3/00; B08B 9/023; B08B 9/093; B08B 2203/02; B08B 2205/00; B08B 1/32; B08B 1/12; B08B 1/143; B08B 13/00; B08B 1/30; B08B 1/165; B08B 3/04; B08B 7/0071; B08B 7/04; B08B 1/20; B08B 15/04; B08B 17/04; B08B 1/00; B08B 1/10; B08B 1/50; B08B 11/04; B08B 6/00; B08B 7/00; B08B 2203/027; B08B 7/02; B08B 1/14; B08B 3/022; B08B 3/026; B08B 7/0042; B08B 9/049; B08B 9/0495;
(Continued)

(56) References Cited

U.S. PATENT DOCUMENTS 5,958,148 A     9/1999   Holzapfel et al.
6,701,661 B2    3/2004   Murello
(Continued)

FOREIGN PATENT DOCUMENTS

CN      111601024 A   *   8/2020  .............. B08B 3/02
CN      111981988 A      11/2020
(Continued)

OTHER PUBLICATIONS

Search Report issued in corresponding European application received by applicant Apr. 5, 2023.

*Primary Examiner* — Michael P Stafira
(74) *Attorney, Agent, or Firm* — Edward T. Kennedy

(57) ABSTRACT

A system is provided for cleaning a drive over reader sensor component. The system includes a drive over reader that in turn includes a housing. At least one sensor component is mounted in a wall of the housing, and a lens of the sensor component is mounted on the wall. The lens is disposed at an angle from about 5 degrees to about 10 degrees relative to a vertical plane of the drive over reader. A fluid nozzle may optionally be mounted to the housing near the lens and oriented at the lens. When employed, the nozzle is fluidly connected to a source of liquid and sprays the lens with the liquid when flow of the liquid is actuated. A method for cleaning a drive over reader sensor component is also provided.

17 Claims, 3 Drawing Sheets

(58) Field of Classification Search
CPC ......... B08B 9/055; G01B 21/02; G01B 11/00; G01B 11/04; G01B 11/0641; G01B 11/24; G01B 11/2545; G01B 21/30; G01B 2210/58; G01B 7/04; G01B 11/14; G01B 11/16; G01B 11/245; G01B 11/25; G01B 11/303; G01B 21/04; G01B 5/06
See application file for complete search history.

(56) References Cited

U.S. PATENT DOCUMENTS

| | | |
|---|---|---|
| 6,944,908 B2 | 9/2005 | Hoetzer et al. |
| 9,046,446 B1 * | 6/2015 | Carroll ................ G01M 17/027 |
| 9,677,973 B1 | 6/2017 | Carroll et al. |
| 9,707,896 B2 | 7/2017 | Boegel et al. |
| 2014/0104426 A1 | 4/2014 | Boegel et al. |
| 2018/0120218 A1 | 5/2018 | Shultis et al. |
| 2019/0077377 A1 * | 3/2019 | Schmidt ................ B60S 1/0848 |
| 2019/0178632 A1 | 6/2019 | Gonzaga et al. |
| 2021/0086727 A1 * | 3/2021 | Bopp ........................ B60S 1/56 |
| 2021/0109345 A1 * | 4/2021 | Robertson, Jr. ........ G01S 7/4043 |
| 2021/0146406 A1 * | 5/2021 | Sykula .................. G01S 7/4813 |
| 2022/0266802 A1 * | 8/2022 | Li .......................... B60S 1/0848 |

FOREIGN PATENT DOCUMENTS

| | | | | |
|---|---|---|---|---|
| CN | 112543267 A | * | 3/2021 | ............. B08B 1/002 |
| CN | 113242362 A | * | 8/2021 | |
| DE | 102012103923 A1 | | 11/2012 | |
| DE | 102021109990 A1 | * | 10/2021 | ............... B08B 3/02 |
| JP | H02190703 A | | 7/1990 | |
| WO | 2008061770 A1 | | 5/2008 | |
| WO | WO-2019232145 A1 | * | 12/2019 | |
| WO | WO-2020086698 A1 | * | 4/2020 | |

* cited by examiner

SYSTEM FOR CLEANING A DRIVE OVER READER SENSOR COMPONENT

FIELD OF THE INVENTION

The invention relates generally to tire monitoring. More particularly, the invention relates to systems that sense a tread depth of a vehicle tire when the vehicle is driven over a reader or station, which is known as a drive over reader. Specifically, the invention is directed to a system for cleaning a drive over reader sensor component to ensure optimum performance of the drive over reader.

BACKGROUND OF THE INVENTION

Multiple tires support a vehicle, and transmit driving and braking forces from the vehicle to the road surface. It is beneficial to periodically measure the wear of the tires, as tire wear plays an important role in vehicle factors such as safety, reliability, and performance. Tread wear, which refers to the loss of material from the tread of the tire, directly affects such vehicle factors. As a result, it is desirable to monitor and/or measure the amount of tread wear experienced by a tire, which is indicated as the tire wear state. It is to be understood that for the purpose of convenience, the terms "tread wear" and "tire wear" may be used interchangeably.

One approach to the monitoring and/or measurement of tread wear has been to measure the tread depth of a tire mounted on a vehicle as the vehicle drives over a station and the tire passes over a sensor mounted in the station. As mentioned above, such a station is known in the art as a drive over reader. The tread depth is measured when the tire is positioned over or adjacent the sensor, depending on the sensor that is employed.

The advantages of a drive over reader include static positioning of the tire tread over the reader contact surface during a short time interval, which enables the tread depth to be determined using contact or contactless methods. Examples of such methods include ultrasonics, radar reflectivity or other optical methods, such as laser triangulation or light section processes, which generate an image of the tire footprint or an image of the tire tread along a lateral line or section. The tread depth is determined from the image.

When optical methods are used, the drive over reader may be equipped with sensor components including a light source, such as a laser, and a recording sensor, such as a camera. For example, a drive over reader configuration employing a laser and a camera, which is described in U.S. Pat. No. 8,621,919, and which is owned by the same Assignee as the present invention, The Goodyear Tire & Rubber Company, may be employed.

As with any wear measurement technique, the precision and repeatability of the tread depth measurement taken by the drive over reader are important considerations. Over time, dirt or other contaminants may build up on the sensor components, and in particular, on a lens of the laser and/or camera. When dirt or other contaminants build up on the lens of the laser and/or camera, the precision and/or repeatability of the drive over reader may be adversely affected.

As a result, there is a need in the art for a system that cleans a drive over reader sensor component to ensure optimum performance of the reader.

SUMMARY OF THE INVENTION

According to an aspect of an exemplary embodiment of the invention, a system is provided for cleaning a drive over reader sensor component. The system includes a drive over reader that includes a housing. At least one sensor component is mounted in a wall of the housing, and a lens of the sensor component is mounted on the wall. The lens is disposed at an angle from about 5 degrees to about 10 degrees relative to a vertical plane of the drive over reader.

According to another aspect of an exemplary embodiment of the invention, a method for cleaning a drive over reader sensor component system is provided. The method includes the step of providing a drive over reader that includes a housing. At least one sensor component is mounted in a wall of the housing, and a lens of the sensor component is mounted on the wall. The lens is disposed at an angle from about 5 degrees to about 10 degrees relative to a vertical plane of the drive over reader.

BRIEF DESCRIPTION OF THE DRAWINGS

The invention will be described by way of example and with reference to the accompanying drawings, in which.

Similar numerals refer to similar parts throughout the drawings.

Definitions

"Axial" and "axially" means lines or directions that are parallel to the axis of rotation of the tire.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint of the tire as measured under normal load and tire inflation, the lines being parallel to the equatorial centerplane.

"Net contact area" means the total area of ground contacting tread elements between the lateral edges around the entire circumference of the tread of the tire divided by the gross area of the entire tread between the lateral edges.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

Figure 1:
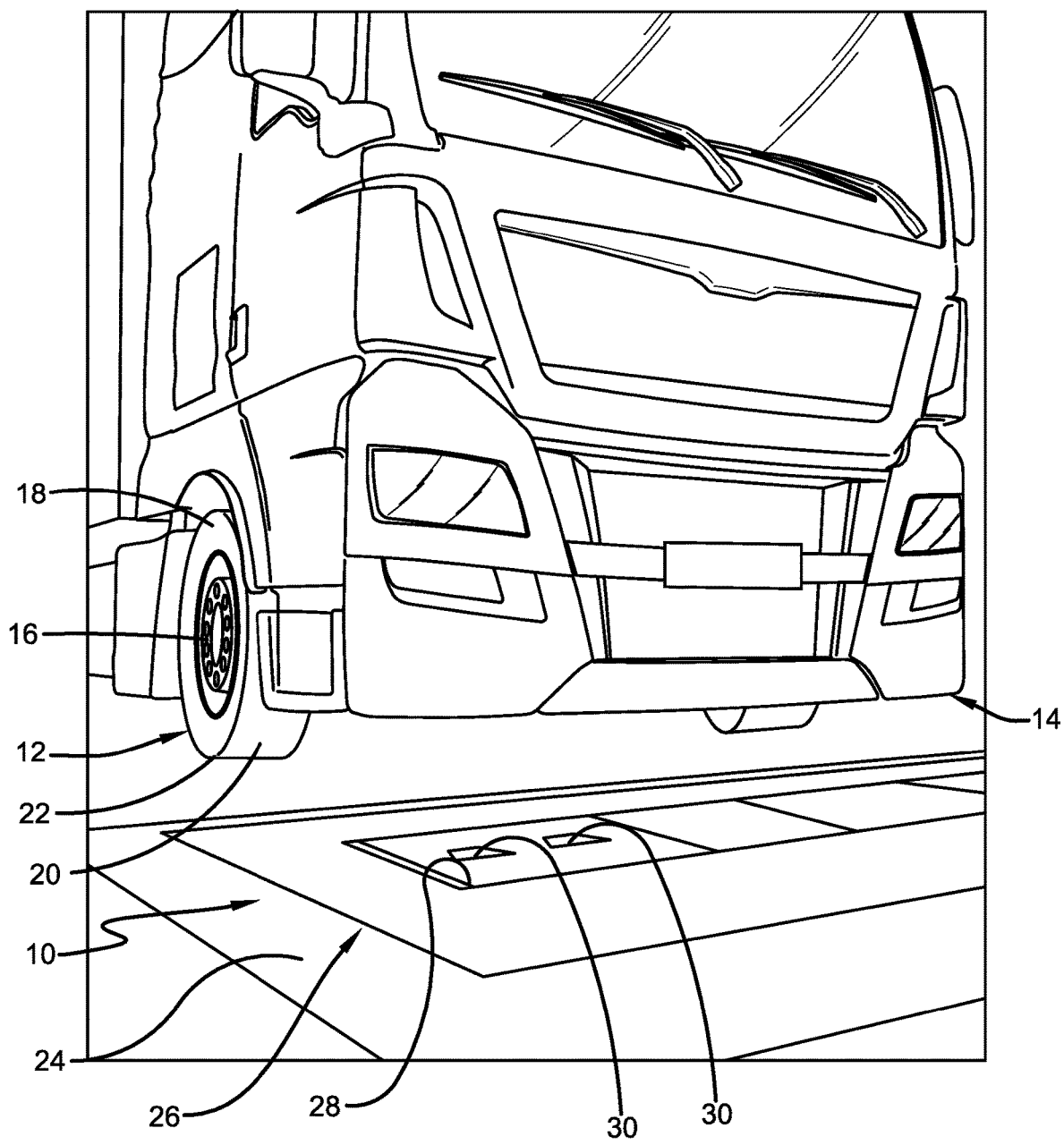
FIG. 1 is a schematic perspective view of an exemplary embodiment of the system for cleaning a drive over reader sensor component of the present invention, shown with the drive over reader installed in the ground and a vehicle approaching the reader.
Figure 2:
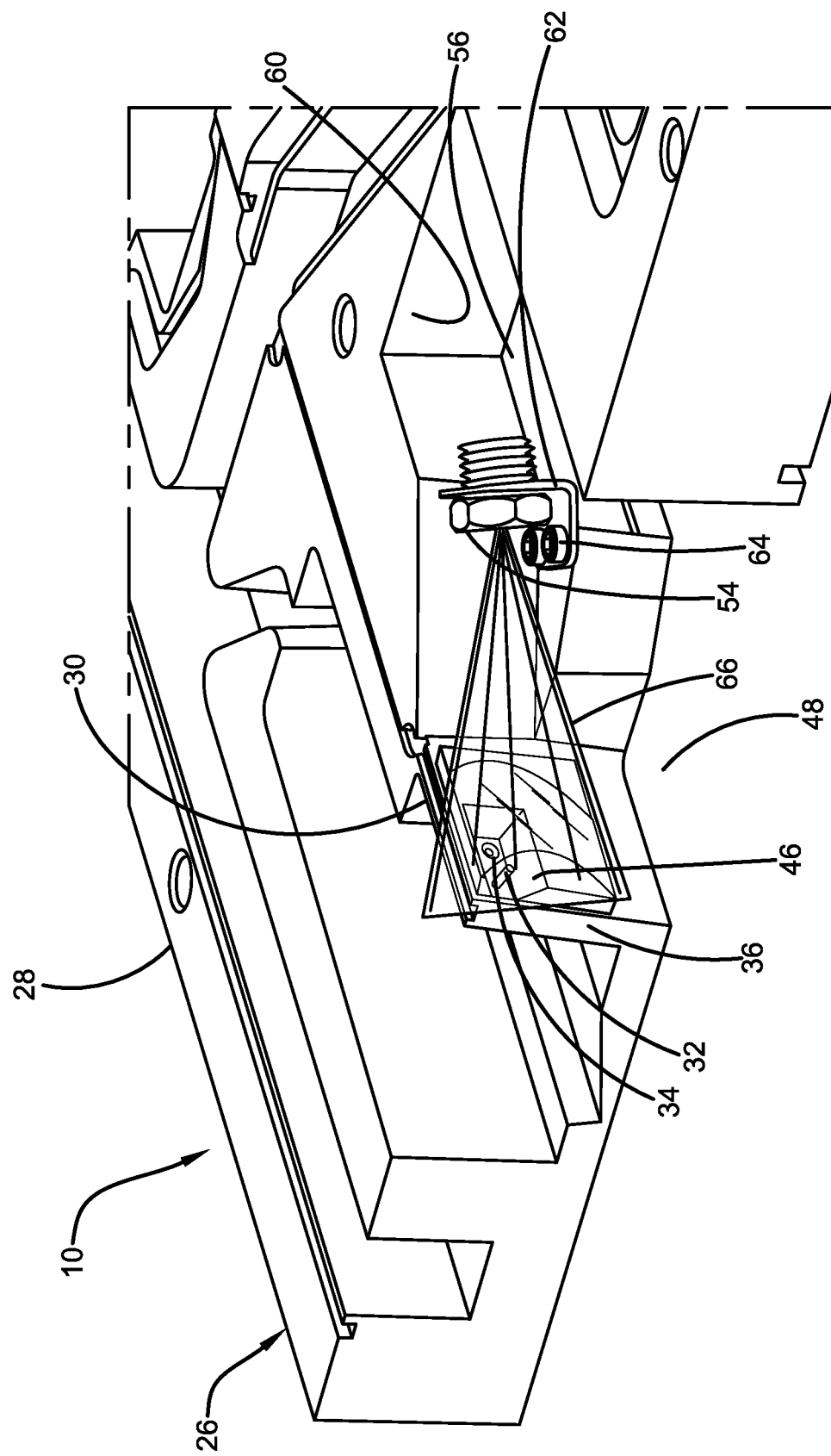
FIG. 2 is a perspective sectional view of the system for cleaning a drive over reader sensor component, and the drive over reader shown, in FIG. 1.
Figure 3:
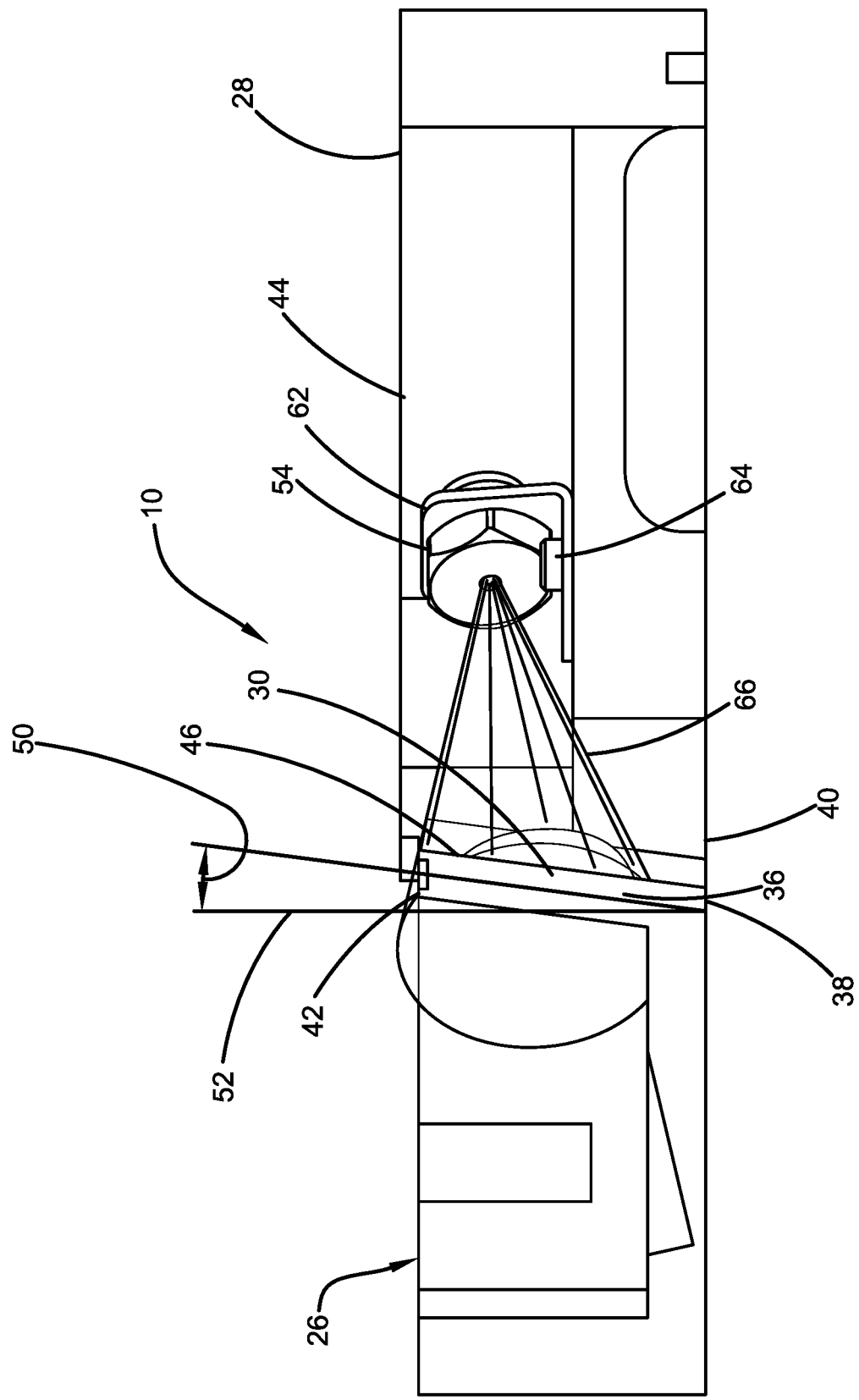
FIG. 3 is an elevational sectional view of the system for cleaning a drive over reader sensor component, and the drive over reader shown, in FIG. 1.

With reference to FIGS. 1 through 3, an exemplary embodiment of a system for cleaning a drive over reader sensor component of the present invention is indicated at 10. The system 10 may be employed on any drive over reader 26 that includes a sensor component with a lens, as will be described in greater detail below. As shown in FIG. 1, the drive over reader 26 estimates the tread depth of each tire 12 supporting a vehicle 14. It is to be understood that the vehicle 14 may be any vehicle type, and is shown by way of example as a commercial vehicle.

The tires 12 are of conventional construction, and each tire is mounted on a respective wheel 16 as known to those skilled in the art. Each tire 12 includes a pair of sidewalls 18 that extend to a circumferential tread 20, which wears with age from road abrasion. As each tire 12 rolls over the ground 24, a footprint 22 is created, which is the area of contact of the tread 20 with the ground.

The drive over reader 26 is mounted in or on the ground 24. The drive over reader 26 includes a housing 28 and at least one sensor component 30 mounted in the housing, as will be described in greater detail below. Preferably, a plurality of sensor components 30 are mounted in the housing 28. The driver of the vehicle 14 directs the vehicle over the drive over reader 26, which causes each tire 12 to roll over the reader. When the tire 12 is positioned over or adjacent the sensors 30, an image of the footprint 22 or an image of the tread 20 along a lateral line or section is generated by the sensors using techniques such as ultrasonics, radar reflectivity, laser triangulation or light section processes. Preferably, laser triangulation is employed. The depth of the tread 20 of the tire 12 is determined from the image.

Techniques for generating the image and measuring the depth of the tread 20 from the image are described by way of example in U.S. Pat. No. 8,621,919, as mentioned above. Other techniques, such as those described in U.S. Pat. Nos. 8,312,766 and 7,942,048, may be employed. All of the aforementioned patents are owned by the same Assignee as the present invention, The Goodyear Tire & Rubber Company, and are incorporated herein by reference.

Turning to FIGS. 2 and 3, each sensor component 30 includes a light source, such as a laser 32, which emits a ray fan to the tire tread 20. Each sensor component 30 also includes a recording sensor, such as a camera 34, which records a signal of a ray fan reflected from the tire tread 20. The laser 32 and the camera 34 are mounted in the housing 28, and more particularly, within a wall 36 of the housing 28. The wall 36 includes a bottom surface 38 that aligns with a bottom surface 40 of the housing 28, and a top surface 42 that aligns with or is below a top surface 44 of the housing.

Each sensor component 30 further includes a lens 46 that is mounted on the wall 36 between the laser 32 and atmosphere 48, and between the camera 34 and atmosphere. The lens 46 may include a single lens or may include multiple lenses. The lens 46 enables the laser 32 to emit a ray fan to the tire tread 20 and the camera 34 to record the reflected ray fan, while protecting the laser 32 and the camera 34.

To prevent dirt or other contaminants from building up on the lens 46, the lens is disposed at an angle 50. Preferably, the angle 50 is from about 5 degrees to about 10 degrees relative to a vertical plane 52 of the drive over reader 26. More preferably, the angle 50 is about 7.5 degrees relative to the vertical plane 52 of the drive over reader 26.

For the lens 46 to be disposed at the angle 50, the wall 36 may be formed parallel to the vertical plane 52 of the drive over reader 26, and the lens is mounted in the wall in an angled manner to achieve the preferred angle. Alternatively, the wall 36 may be formed at the angle 50. For example, the top surface 42 of the wall may be angled away from the vertical plane 52 of the drive over reader 26 at the angle 50 and the lens 46 is evenly mounted in the wall, thereby disposing the lens at the preferred angle. By disposing the lens 46 at the angle 50, the system 10 reduces the adhesion of dirt and other contaminants to the lens.

The system 10 may optionally include at least one fluid nozzle 54. More particularly, when employed, the fluid nozzle 54 may be mounted on a horizontal wall 56 of the housing 28 in a horizontally-extending recess 60 near the lens 46 and below the top surface 42 of the housing 28. The fluid nozzle 54 may be removably secured or mounted to the housing 28. For example the fluid nozzle 54 may be secured with a bracket 62 and mechanical fasteners, such as bolts 64. Alternatively, the fluid nozzle 54 may be integrated into the housing 28.

The nozzle 54 is fluidly connected to a source of water or other liquid 66 and is oriented at the lens 46. Such an orientation enables the nozzle 54 to spray the lens 46 with water or other liquid 66 to selectively cleans debris from the lens when flow of the water or other liquid is actuated. The angle 50 of the lens 26 enables the water or other fluid 66 to drip or run down from the lens 26, thereby preventing water from remaining on the lens and keeping the lens clean. Fluids 66 other than water may be employed, including wiper fluid, which freezes at a lower temperature than water, and may be employed in cold ambient temperatures.

In this manner, the system for cleaning a drive over reader sensor component of the present invention 10 cleans a sensor component 30 of a drive over reader 26 to reduce buildup of dirt or other contaminants on the lens 46 of the sensor component. The system 10 includes a lens 46 disposed at a predetermined angle 50 that reduces the adhesion of dirt and other contaminants to the lens, and optionally includes a fluid nozzle 54 which selectively sprays the lens with water or other fluid 66 to clean debris from the lens. By reducing buildup of dirt or other contaminants on the lens 46, the system 10 ensures optimum performance of the drive over reader 26.

The present invention also includes a method for cleaning a drive over reader sensor component. The method includes steps in accordance with the description that is presented above and shown in FIGS. 1 through 3.

It is to be understood that the steps and accompanying structure of the above-described system and method for cleaning a drive over reader sensor component of the present invention 10 may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A system for cleaning a drive over reader sensor component, the system including:
    a drive over reader including a housing;
    at least one sensor component mounted in a wall of the housing;
    a lens of the sensor component being mounted on the wall, wherein the lens is disposed at an angle from about 5 degrees to about 10 degrees relative to a vertical plane of the drive over reader; and
    at least one fluid nozzle mounted to the housing near the lens and oriented at the lens, the nozzle being fluidly connected to a source of liquid and spraying the lens with the liquid when flow of the liquid is actuated, the liquid including at least one of water and wiper fluid, wherein the angle of the lens enables the liquid to run from the lens.

2. The system for cleaning a drive over reader sensor component of claim 1, wherein the angle is about 7.5 degrees relative to the vertical plane of the drive over reader.

3. The system for cleaning a drive over reader sensor component of claim 1, wherein the at least one sensor component includes a light source.

4. The system for cleaning a drive over reader sensor component of claim 3, wherein the light source includes a laser.

5. The system for cleaning a drive over reader sensor component of claim 4, wherein the at least one sensor component includes a recording sensor.

6. The system for cleaning a drive over reader sensor component of claim 5, wherein the recording sensor includes a camera.

7. The system for cleaning a drive over reader sensor component of claim 6, wherein:
    the laser and the camera are mounted in the wall of the housing;
    the lens is mounted on the wall between the laser and atmosphere; and
    the lens is mounted on the wall between the camera and atmosphere.

8. The system for cleaning a drive over reader sensor component of claim 1, wherein the wall of the housing is formed parallel to the vertical plane of the drive over reader, and the lens is mounted on the wall in an angled manner to achieve the angle.

9. The system for cleaning a drive over reader sensor component of claim 1, wherein:
    the wall includes a bottom surface that aligns with a bottom surface of the housing;
    the wall includes a top surface that aligns with or is below a top surface of the housing;
    the top surface of the wall is angled away from the vertical plane of the drive over reader at the angle; and
    the lens is evenly mounted on the wall, thereby disposing the lens at the angle.

10. The system for cleaning a drive over reader sensor component of claim 1, wherein the lens is a single lens.

11. The system for cleaning a drive over reader sensor component of claim 1, wherein the lens includes multiple lenses.

12. The system for cleaning a drive over reader sensor component of claim 1, wherein the fluid nozzle is mounted on a horizontal wall of the housing in a horizontally-extending recess of the housing.

13. The system for cleaning a drive over reader sensor component of claim 1, wherein the fluid nozzle is removably mounted to the housing.

14. The system for cleaning a drive over reader sensor component of claim 1, wherein the fluid nozzle is integrated into the housing.

15. The system for cleaning a drive over reader sensor component of claim 1, wherein the at least one sensor component employs laser triangulation to determine a tread depth of a tire.

16. A method for cleaning a drive over reader sensor component, the method comprising the steps of:
    providing a drive over reader including a housing;
    mounting at least one sensor component in a wall of the housing;
    mounting a lens of the sensor component on the wall;
    disposing the lens at an angle from about 5 degrees to about 10 degrees relative to a vertical plane of the drive over reader;
    mounting at least one fluid nozzle to the housing near the lens and oriented at the lens;
    fluidly connecting the nozzle to a source of liquid; and
    spraying the lens with the liquid when flow of the liquid is actuated, the liquid including at least one of water and wiper fluid, wherein the angle of the lens enables the liquid to run from the lens.

17. The method for cleaning a drive over reader sensor component of claim 16, wherein:
    the at least one sensor component includes a laser and a camera;
    the step of mounting at least one sensor component in a wall of the housing includes mounting the laser and the camera in the wall of the housing; and
    the step of mounting a lens of the sensor component on the wall includes mounting the lens between the laser and atmosphere and between the camera and atmosphere.

* * * * *